United States Patent [19]
Mohan

[11] Patent Number: 5,654,884
[45] Date of Patent: Aug. 5, 1997

[54] MULTISTAND AC/DC CONVERTER WITH BASELINE CROSSING DETECTION

[75] Inventor: Muni Mohan, Singapore, Singapore

[73] Assignee: SGS-Thomson Microelectronics Pte. Ltd., Singapore

[21] Appl. No.: 383,051

[22] Filed: Feb. 3, 1995

[30] Foreign Application Priority Data

Feb. 4, 1994 [GB] United Kingdom ............ 9402156

[51] Int. Cl.⁶ .................................................. H02M 7/06
[52] U.S. Cl. ...................... 363/126; 363/61; 363/142
[58] Field of Search ................................ 363/125, 126, 363/127, 128, 142, 143, 84, 85, 86, 61

[56] References Cited

U.S. PATENT DOCUMENTS

| | | | |
|---|---|---|---|
| 4,665,323 | 5/1987 | Russell et al. | 307/75 |
| 4,783,729 | 11/1988 | Konopka | 363/143 |
| 4,805,083 | 2/1989 | Konopka | 363/143 |
| 4,837,672 | 6/1989 | Donze | 363/143 |
| 4,845,607 | 7/1989 | Nakao et al. | 363/49 |
| 4,864,488 | 9/1989 | Bulmahn et al. | 363/143 |
| 4,933,832 | 6/1990 | Schneider et al. | 363/143 |
| 5,097,402 | 3/1992 | Kriz et al. | 363/61 |
| 5,162,984 | 11/1992 | Castagnet et al. | 363/61 |
| 5,287,263 | 2/1994 | Shilo | 363/143 |

FOREIGN PATENT DOCUMENTS

| | | |
|---|---|---|
| 0131102 | 5/1984 | European Pat. Off. . |
| 0448165 | 3/1991 | European Pat. Off. . |
| 0448434 | 3/1991 | European Pat. Off. . |
| 1299560 | 6/1971 | United Kingdom . |
| 2144931 | 4/1987 | United Kingdom . |
| 2157031 | 8/1987 | United Kingdom . |

*Primary Examiner*—Peter S. Wong
*Assistant Examiner*—Adolf Berhane
*Attorney, Agent, or Firm*—Vinson & Elkins LLP

[57] ABSTRACT

The current invention provides circuitry for use in an integrated circuit controlled voltage doubler/bridge circuit such that during any period wherein a lack of AC supply voltage is detected by the circuitry and following a period of AC input voltage within a lower defined range of values, repeated triac firing pulses are provided such that the AC supply will be rectified and doubled as soon as such a supply returns, whether the supply returns with the same or opposite polarity to that which it had, just before being interrupted.

41 Claims, 9 Drawing Sheets

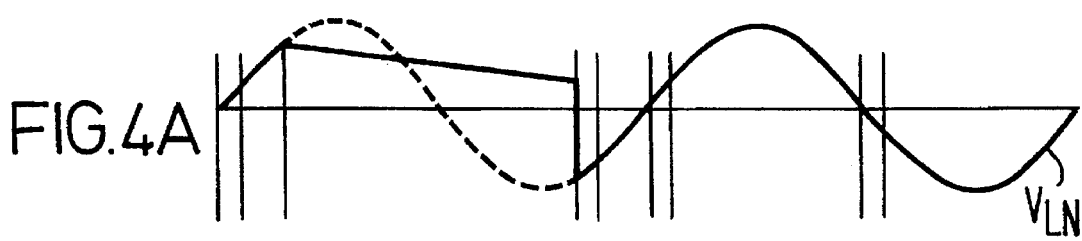
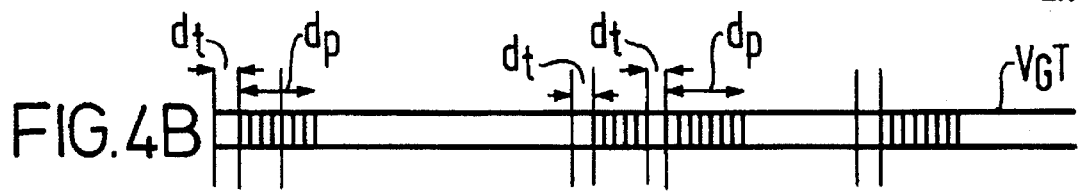
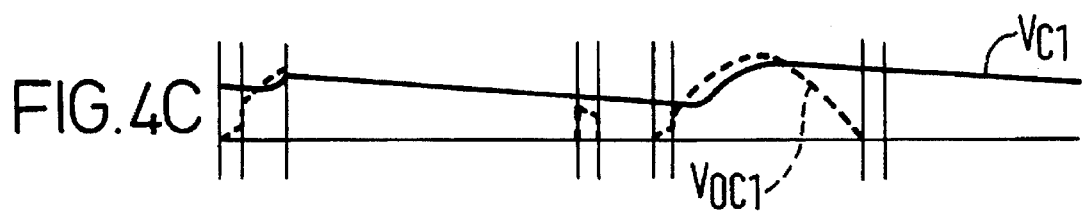
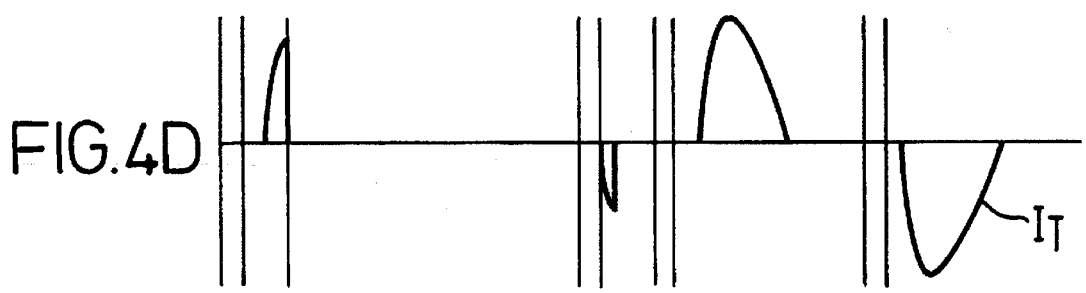
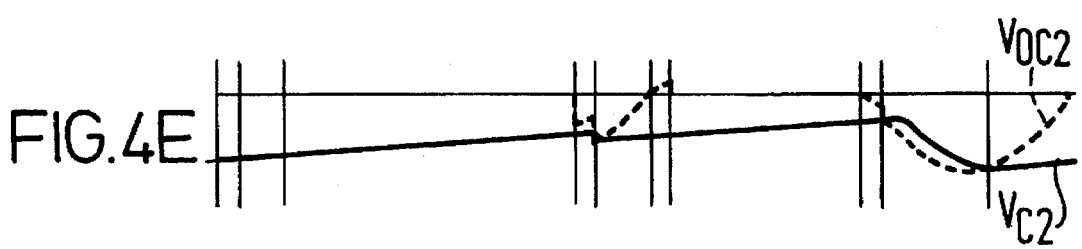
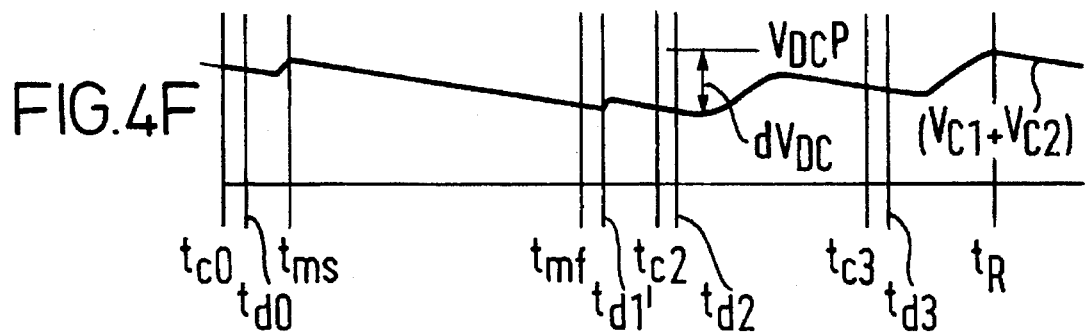

MULTISTAND AC/DC CONVERTER WITH BASELINE CROSSING DETECTION

FIELD OF THE INVENTION

The present invention concerns a circuit for converting an AC input voltage lying within a predetermined range of frequencies and which varies on either side of a base level into a DC output voltage at or above a predetermined minimum level.

BACKGROUND OF THE INVENTION

There exists, throughout the world, a wide variety of mains AC voltages. Broadly, there are two groups: those of the low voltage range (88 V–132 V) and those of the high voltage range (176 V–264 V). It is desirable to design electrically powered equipment which can be used throughout the world, thereby simplifying design and production and allowing equipment to be portable between countries other than where originally purchased. This requires that the equipment must be adaptable for use on both low and high voltage ranges. AC electrical power is distributed at frequencies of nominally 50 to 60 Hz, with a tolerance of 3 Hz typically allowed.

The requirement for a circuit to provide a substantially constant DC voltage when supplied with a range of AC input voltages is popularly fulfilled by the use of a doubler/bridge switch in association with an AC to DC converter circuit. Such a switch operates so as to select voltage doubling and rectification for AC inputs of the low voltage range and to select full wave bridge rectification for AC inputs of the high voltage range. Both manual and automatic types are known.

FIG. 1 shows a typical doubler/bridge arrangement for rectification and smoothing of input AC voltage $V_{AC}$, diodes $D_1$ to $D_4$ forming a full-wave bridge rectifier, with AC input voltage $V_{AC}$ being applied between nodes 2, 3 and the rectified output available between nodes 4, 5. Capacitors $C_1$ and $C_2$ act to smooth the rectified output to a constant DC level, and switching element T permits the switching between full wave bridge rectification when in a non-conducting state, and voltage doubling rectification when in a conducting state. A load L may be connected between nodes 4, 5. When this circuit is used in voltage doubling rectifier mode, capacitor $C_1$ is the positive half cycle smoothing capacitor, and capacitor $C_2$ is the negative half cycle smoothing capacitor. In a manually controlled circuit, the switching element is a mechanical switch. In an automatic doubler/bridge circuit, the switching element T may be a relay, a triac or another equivalent device.

Once a triac is turned on by applying a bias voltage to its control terminal, it will then remain conductive until the current through it fails below the minimum holding current value, irrespective of the voltage applied to its control terminal. Hence, only a short pulse of bias voltage is required to turn on a triac, provided that the potential difference between its main terminals is greater than that required to cause the minimum holding current to flow.

Missing cycles are temporary blockages of the AC power, and are produced, for example, during changeover of the power supply between substations and feeder lines of the electricity supply company. As missing cycles represent periods of no mains supply, the voltage output of an AC/DC converter will drop as a result of the load draining charge from its output smoothing capacitors until resumption of AC supply.

Manually controlled doubler/bridge circuits require the operator of the electrical equipment to set the switch in the correct position before applying the AC mains supply.

The manually controlled doubler/bridge circuit has a major drawback in that the operator may forget to check the position or choose the wrong position of the switch, which could cause doubling of a high voltage, leading to damage to the equipment. Alternatively, the equipment could be designed to withstand such damage, leading to extra cost of the equipment.

Several types of automatic doubler/bridge switches are known, which automatically select voltage doubling and rectification of the input voltage when a 110 V line voltage is applied and select full wave rectification when a 220 V line voltage is applied. Examples of such circuits may be found described in U.S. Pat. Nos. 4,665,323; 4,845,607; 4,933,832 and British patent numbers 1,299,560; 2,144,931, 2,157,031. Such automatic switches may be constructed of discrete components, or constructed within an integrated circuit. Both the integrated type, and the type constructed with discrete components use a full-wave rectifier bridge, with a switching element and two capacitors, allowing both voltage doubling rectification and bridge rectification to be performed. The switching elements of the prior art are electrically operated mechanical switches (relays) or solid state bi-directional switches, for example triacs. The conducting state of such a triac is controlled by the presence or absence of a bias voltage applied to its control gate, such voltage being supplied by an automatic circuit as a function of the voltage applied to the equipment. The known designs of automatic doubler/bridge switch usually produce either a continuous bias voltage or a continuous series of firing pulses to the gate of triac T. Whilst this ensures immediate recovery of output voltage following a missing cycle, an unacceptably large power consumption results. In some circuits, up to 12 W of power may be consumed by the control circuitry, and 80% of this in triac gate firing pulses.

Equally, a manually controlled circuit could use a triac or equivalent as the switching element T with a manual switch controlling the presence or absence of a bias voltage to the triac control terminal.

When such an automatic doubler/bridge circuit operates in voltage doubling rectifier mode under constant AC supply, the triac switching element T conducts from the moment a firing pulse is provided by the control circuit until the current through its main terminals falls below the holding current. During a positive half cycle, current flows through diode $D_1$ to charge the positive half cycle smoothing capacitor $C_1$ while the input AC voltage $V_{AC}$ is higher than the voltage across the terminals of that capacitor. The capacitor charges up through the triac until the point of maximum charge, usually just after the peak value of the input AC voltage. At this point, the capacitor charging current ceases as the input AC voltage $V_{AC}$ drops, and the triac turns off. Similarly, during a negative half cycle, current flows through diode $D_2$ to charge the negative half cycle smoothing capacitor $C_2$ until its point of maximum charge, just after the peak negative input voltage of the AC mains. In this way, the voltage across each one of capacitors $C_1$, $C_2$ is almost equal to the peak AC mains input voltage, and the total DC voltage available at the output terminals 4, 5 for application to load L is approximately double the peak AC input voltage. The diodes $D_1$, $D_2$ are reverse biased after the AC input voltage has dropped below the voltage across the terminal of the capacitor and hence the charge stored on capacitors $C_1$, $C_2$ is prevented from discharging through them.

When a load L is connected to terminals 4, 5 the capacitors discharge through the load and supply it with the required DC current. This discharging causes the voltage across the capacitors $C_1$, $C_2$ to decrease, until each one is charged during the following positive or negative mains half cycle, respectively. This discharging and charging causes a ripple voltage on the DC output voltage. The size of the capacitors $C_1$, $C_2$ is chosen so that the charge stored smoothes the DC output voltage to have an acceptable level of ripple.

One integrated circuit implementation described in U.S. Pat. No. 5,162,984 has particular advantages due to its small size and extremely low power consumption. Triac firing pulses are produced only during a limited time period soon after zero crossing points of the AC voltage, thus ensuring efficient triac turn-on, whilst the current consumption by the triac firing pulses is minimised. It has become a popular circuit for AC to DC conversion.

FIG. 2 shows a circuit incorporating such an automatic doubler/bridge control circuit. AC mains input voltage $V_{LN}$ is applied to power supply lines $V_L$, $V_N$ connected to nodes 2, 3 of the bridge rectifier formed by diodes $D_1$–$D_4$. An integrated circuit automatic doubler/bridge control circuit 7 is connected to the neutral mains input line $V_N$, which may be regarded as a supply voltage. The doubler/bridge control circuit 7 is further connected to node 9, which may be regarded as a virtual ground voltage for the IC supply. Node 9 is itself connected by capacitor 11 to the neutral AC input line $V_N$, and to the live AC input line $V_L$ by a series arrangement of a resistor 13 and a diode 15. Two series connected resistors 17, 19, are connected between the node 9 and the live mains input line $V_L$, the node 21 between the resistors 17,19 being connected to control circuit 7. A resistor 23 is connected between the node 21 and the neutral mains input line $V_N$. An output of the control circuit 7 is connected to the gate of the triac switching element T through a current limiting resistor 25.

The half wave rectifier comprising diode 15, resistor 13 and capacitor 11 provides a DC supply voltage $V_c$ to the control circuit 7. This supply is typically 9 V lower than the voltage of the neutral mains supply line $V_N$, regulated by a voltage regulator internal to the control circuit 7.

Resistors 17, 19, 23 scale down and bias the AC input voltage $V_{LN}$ to a voltage at node 21 which is used by the control circuit 7 to produce triac firing pulses to triac T just after every mains zero crossing point if a low range AC voltage is in use (i.e. if voltage doubling rectifier mode is required). The control circuit 7 generates and uses internally: a signal RI, being the output of a voltage comparator, which indicates whether the AC supply voltage falls within a first, high range of supply voltages Rge1, or whether the AC mains lies within a second, low range of supply voltages Rge2; a clock signal Ck; and a zero cross detection signal T1 is a short active high pulse generated in response to each zero crossing of AC supply.

FIGS. 3A to 3F show a typical timing relationship for the operation of such a known automatic doubler/bridge circuit operating in voltage doubling rectifier mode during a period of constant AC supply, with the load L connected to the DC output. In FIG. 3A, $V_{LN}$ represents the input AC voltage; in FIG. 3B, $V_GT$ represents the triac gate voltage; in FIG. 3C, $V_{C1}$ represents the voltages across the terminals of capacitor $C_1$ and $V_{CO1}$ represents the open circuit voltage which would appear across terminals 4, 6 in the absence of the load and the capacitor $C_1$, with the triac becoming conductive at the first triac pulse after zero crossing; in FIG. 3D, $I_T$ represents the current flowing through the main terminals of the triac T; in FIG. 3E, $V_{C2}$ represents the voltages at the terminals of capacitor $C_2$ and $V_{CO2}$ represents the open circuit voltage which would appear across terminals 5, 6 in the absence of the load and the capacitor $C_2$, with the triac becoming conductive at the first triac pulse after zero crossing; and in FIG. 3F, ($V_{C1}+V_{C2}$) represents the total DC output voltage between terminals 4, 5.

In FIGS. 3C, 3E, the dashed lines representing the open circuit voltages $V_{CO1}$, $V_{CO2}$ represent the maximum possible voltage which could be applied to the capacitors $C_1$, $C_2$ at any particular instant.

The AC input waveform $V_{LN}$ crosses the zero voltage level at zero crossing points $t_{c0}$–$t_{c3}$.

As shown in FIG. 3B, a short time $d_t$ after each zero crossing, at times $t_{d0}$–$t_{d3}$, a series of pulses lasting for a period $d_p$ are produced on the triac gate voltage $V_GT$. These triac firing pulses are active-LOW; during the active state the triac gate terminal is held at the voltage of the virtual ground, node 9 in FIG. 2 and at other times the triac gate is held at the voltage of the neutral line, $V_N$ and node 3 in FIG. 2. The timing of these triac gate pulses is designed to allow the triac to be conductive as soon as possible after the voltage across the triac is sufficient to maintain a holding current. This corresponds to times $t_{i0}$–$t_{i3}$ in FIG. 3C, when the voltage available to charge the capacitor $V_{CO1}$ first exceeds the voltage $V_{C1}$ across capacitor $C_1$ sufficiently to hold the triac on. Times $t_{i0}$–$t_{i3}$ vary in their temporal location as the load current supplied by the circuit, and hence the ripple voltage, varies. An increased load will mean a greater capacitor discharge between charging half cycles and hence an increased ripple voltage and an earlier location of time $t_{i0}$. A sequence of triac gate firing pulses is required to ensure that the triac is turned on as early as possible, independently of the ripple voltage at any particular instant, but the duration $d_p$ of the series of pulses should be no longer than necessary, to avoid excessive current consumption.

Considering only the first half cycle of mains, between times $t_{c0}$ and $t_{c1}$, as shown in FIG. 3D, the triac beans to conduct current $I_T$ at time $t_{i0}$, which charges capacitor $C_1$. With the triac conductive, the full AC supply is applied across capacitor $C_1$. In the periods $d_t$ between the zero crossing points $t_{c0}$–$t_{c3}$ and the associated triac turn on time $t_{i0}$–$t_{i3}$ the rectifier circuit is operating in bridge rectifier mode and the input AC voltage is applied across the series combination of both capacitors.

The terminal voltage $V_{C1}$ across the capacitor $C_1$ rises, as shown in FIG. 3C. The open circuit voltage available $V_{CO1}$ exceeds the capacitor terminal voltage $V_{C1}$ during this period, due to resistive losses caused by the current flowing to the load L and the current charging the capacitor.

After reaching its peak value, the mains voltage falls and a time $t_{x0}$ is reached, soon after the peak voltage of AC mains, where difference between the capacitor terminal voltage $V_{C1}$ and the voltage available $V_{CO1}$ is less than the voltage required to maintain the minimum holding current through the triac. At this time, $t_{x0}$, the triac turns off and the current $I_T$ through the triac falls to zero (FIG. 3D). At this time, $t_{x0}$, the capacitor $C_1$ is charged to a voltage almost equal to the peak value of AC mains input voltage.

For the remainder of this half cycle, from time $t_{x0}$ to time $t_{i2}$, diodes $D_1$ and $D_3$ are reverse biased and the charge on the capacitor discharges through the load L. This causes the capacitor terminal voltage $V_{C1}$ to drop during this period (FIG. 3C).

Symmetry of the circuit and the AC mains applied dictates identical operation during the negative half cycle, from time $t_{c1}$ to time $t_{c2}$. Zero crossing at time $t_{c1}$ causes a series of triac firing pulses starting at time $t_{d1}$, for a period of $d_p$. Capacitor $C_2$ is charged through diode $D_2$ and triac T, between times $t_{i1}$ and $t_{X1}$. The charge stored discharges through the load between times $t_{X1}$ and $t_{i3}$. The capacitor terminal voltage $V_{C2}$ will drop, shown in FIG. 3E, during this period by an amount which depends on the current demand of the load, and the size of capacitor $C_2$.

FIG. 3F shows the output voltage, which is supplied across both capacitors $C_1$ and $C_2$, achieving a DC output voltage ($V_{C1}+V_{C2}$) approximately double the AC input voltage. The voltage drop of each capacitor's terminal voltage gives rise to a ripple voltage Vr in the DC output voltage ($V_{C1}+V_{C2}$), at double the frequency of the AC input. For any given load requirement, the size of the capacitors $C_1$ and $C_2$ is chosen to reduce this ripple voltage Vr to a tolerable magnitude.

The voltage waveforms $V_{C1}$, $V_{C2}$ across the output capacitors $C_1$, $C_2$ respectively are identical to those resulting from the use of a conventional voltage doubling circuit with an electrical connection in the place of the triac T.

The remaining ripple voltage $V_r$ in the output voltage ($V_{C1}+V_{C2}$), exaggerated for clarity in the diagrams, depends on the mount of discharge the capacitors $C_1$ and $C_2$ undergo during the period between triac turn-on times $t_{i0}-t_{i3}$ and hence the loading applied to the output. The maximum output level $V_{DC}P$ of DC Output voltage ($V_{C1}+V_{C2}$) is obtained at each triac turn-off time $t_{x0}-t_{x3}$. This level will be used as a reference below.

During a missing cycle, the voltage $V_{LN}$ will be held at the voltage of the AC mains input when the power interruption started, by the capacitance of a mains filter habitually connected across the input mains terminals of switched mode power supplies and the like, to prevent incoming or outgoing noise on the AC supply line, or the capacitance of the AC line and circuit itself, decaying towards zero as the capacitance discharges.

The automatic integrated doubler/bridge switching circuit described in U.S. Pat. No. 5,162,984 works well with a constant sinusoidal AC supply voltage but suffers when missing cycles occur on the mains input.

This circuit reacts in two very different ways to missing cycles of AC mains, depending on whether the mains input recovers with the same or the opposite polarity to that which it had at the interruption of power.

FIGS. 4A–4E show timing relationships for the operation of a known automatic doubler/bridge circuit in voltage doubling rectifier mode during and after a missing cycle of power supply which recovers with the opposite polarity to that when the interruption started. Features identical to those in FIGS. 3A–3E have identical reference symbols.

At time $t_{ms}$, the AC supply $V_{LN}$ is interrupted, shown in FIG. 4A; it returns with the opposite polarity at time $t_{mf}$, rather less than one period later. During the missing cycle between times $t_{ms}$ and $t_{mf}$, the capacitors $C_1$, $C_2$ discharge through the applied load and so the output voltage ($V_{C1}+V_{C2}$) drops. The rate of voltage decay depends on the current demand of the applied load and the size of capacitors $C_1$, $C_2$. Due to the lack of input power, the current $I_T$ through the triac, shown in FIG. 4D, fails below its holding current and it turns off at time $t_{ms}$. When the power returns at time $t_{mf}$, the AC supply voltage which has been held above zero by inherent capacitance in the mains supply system and the electrical apparatus containing the circuit crosses the zero voltage line to attain the polarity of the recovered AC input. The control circuit interprets this as a standard zero crossing detection, and initiates triac firing pulses a delay $d_r$ later, at time $t'_{d1}$, as after a normal zero crossing point. This initiates triac conduction, FIG. 4D, and further charging of the capacitor $C_2$, raising the capacitor's terminal voltage $V_{C2}$, FIG. 4E, and the DC output voltage, FIG. 4F. Voltage doubling mode thus recommences very soon after the recovery of the AC mains, and full DC output voltage is achieved at time $t_R$, during the second full half cycle after AC supply recovery time $t_{mf}$. The maximum reduction in output voltage $dV_{DC}$ below the reference value $V_{DC}P$ is minimised by the fact that the input voltage resumption at time $t_{mf}$ instantly causes a zero crossing, and resumption of voltage doubling mode. The triac firing pulses generated after the resumption of power at time $t_{mf}$ are stopped if a further zero crossing $t_{c2}$ occurs before the triac firing pulse generation period $d_p$ has elapsed. After the next zero crossing time $t_{c2}$, normal operation resumes with the generation of triac firing pulses at time $t_{d2}$.

FIGS. 5A–5F show analogous timing relationships for the operation of such an automatic doubler/bridge circuit operating in voltage doubling rectifier mode during and after a missing cycle which recovers with the same polarity as that when interrupted. Features identical to those in FIGS. 3A–3F have identical reference symbols.

At time $t_{ms}$, the AC supply $V_{LN}$ is interrupted; it returns with the same polarity at time $t_{mf}$, somewhat less than one period later. During this missing cycle the capacitors $C_1$, $C_2$ discharge through the applied load and so the output voltages $V_{C1}$, $V_{C2}$ drop. The rate of voltage decay depends on the current demand of the applied load L. At the time of power interruption $t_{ms}$, the current $I_T$ through the triac stops and the triac turns off.

When the power returns at time $t_{mf}$ the circuit is in bridge rectifier mode, as the triac is turned off. For the remaining part of the half cycle until time $t_{c2}$, there are no valid zero crossings to initiate triac firing pulses and hence triac conduction and voltage doubling. Following the resumption of power at time $t_{mf}$ the voltage $V_{OC1}$ available to capacitor $C_1$ is half that which it would have been without a missing cycle, the other half of the voltage also being available to capacitor $C_2$. This may help the recovery of DC output voltage ($V_{C1}+V_{C2}$), FIG. 5F, (depending on the state of discharge of the capacitors $C_1$, $C_2$) but the DC output voltage remains much reduced. Following the next valid zero cross at time $t_{c2}$, the next triac firing pulse series begins at time $t_{d2}$, and voltage doubling rectifier mode is resumed. As shown in FIG. 5F, the DC output voltage ($V_{C1}+V_{C2}$) is reduced from the time of the power interruption $t_{ms}$ until the second full half cycle after power resumption (one of each polarity), even though full power has been available since the resumption of power at time $t_{mf}$. The output voltage drop $dV_{DC}$ is greater than that in the case of power resumption with opposite polarity, FIG. 4F. This reduction in output voltage $dV_{DC}$ can be significant when moderate to heavy loads are applied to the output DC supply. This voltage drop can impair the functioning of computers and video equipment by causing loss of stored data and faulty video signals.

SUMMARY OF THE INVENTION

Accordingly, an object of the current invention is to provide an automatic doubler/bridge circuit consuming a minimum amount of power in the generation of triac firing pulses, which is able to respond quickly to the resumption of low voltage range AC power following a missing cycle, in order that voltage doubling be resumed as soon as possible, to obtain full voltage output, minimising the voltage drop at the output during a missing cycle.

Preferred embodiments of the invention seek to provide an automatic voltage doubler/bridge switch which detects the presence of a missing cycle over the entire range of possible input frequencies, and acts to initiate triac conduction if the AC voltage before interruption was within the lower defined range of voltages Rge2 and not to initiate triac conduction if the AC voltage before interruption was within the higher defined range of voltages Rge1.

They also seek to provide an automatic doubler/bridge circuit which recovers quickly from missing cycles and will not double a high range supply voltage if such a voltage occurs upon supply resumption.

The invention provides a circuit for converting an AC input voltage lying within a predetermined range of frequencies and which varies on either side of a base line voltage into a DC output voltage at or above a predetermined minimum level comprising:

a voltage rectification circuit which is operable in a first mode to rectify an AC input voltage lying in a first range of values to produce said DC output voltage and which includes a switch element having a control terminal for receiving a control signal to select the first mode;

baseline voltage crossing detection circuitry arranged to detect baseline crossings of the AC input voltage and to generate the control signal responsive to each baseline crossing;

a timer which is reset at each baseline crossing and which commences measuring a delay from each reset, the timer being operable to generate the control signal when the delay reaches a predetermined value, the predetermined value of the delay being greater than the half period of the lowest of the predetermined range of frequencies.

The particular features of the invention substantially reduce the drop in output DC voltage of an AC to DC converter when a missing cycle of AC supply voltage occurs, while maintaining a low power consumption by the circuit. The control signal is applied to the switching element for a period of time when a missing cycle is detected.

A particular embodiment of the invention provides a circuit wherein the control signal is generated at a predetermined time after each detected baseline crossing, the predetermined time being much shorter than the half period of the lowest of the predetermined range of frequencies. This ensures that the first mode of operation commences as soon as possible after each baseline crossing detection, without consuming excessive power in generating the control signal for a longer period than necessary.

Particular embodiments of the invention provide a circuit wherein the first mode of operation increases and rectifies the AC input voltage and a second mode of operation rectifies the AC input voltage when the AC input voltage lies above the first range of values, the switch element being operable to select between the first and second modes of operation. This allows a substantially constant DC output voltage to be produced when different AC input voltages are applied.

A voltage level detection circuit may be provided for determining whether the AC voltage lies in the second range of values and for producing a detection signal. This allows the selection of the mode of operation based on the input AC voltage level.

Means may be provided for inhibiting supply of the control signal to the switch element when the detection signal indicates that the AC input voltage is inside the second range of values. This allows the prevention of increasing an AC input voltage lying within the second range.

The switching element may be a triac. The control signal will then consist of a plurality of pulses applied to the gate terminal of the triac.

The various periods of time may be measured by one or more digital counters, being supplied with a clock signal. This allows easy integration into an integrated circuit, and accurate control over the timing periods.

A first digital timer may be provided to measure the predetermined time after each detected baseline crossing; a second digital timer may be provided to measure the first time period from the first initiation of the pulses; a third digital timer may be provided to measure the predetermined value of the delay and a fourth digital timer may be provided to measure the second time period from the second initiation of the pulses.

Alternatively, a single digital timer may be used in conjunction with logic circuitry to measure both the predetermined delay and the second time period from the second initiation of the pulses.

One embodiment of the invention will be described in detail below, with reference to FIGS. 6A to 10 of the accompanying diagrams.

BRIEF DESCRIPTION OF THE DRAWINGS

In the Drawings,

FIGS. 4A–4F are timing diagrams of various voltages applied to and supplied by an automatic doubler/bridge circuit such as that of FIG. 2, operating in voltage doubling rectifier mode during a period including an interruption of the AC supply which recovers with opposite polarity to that which it had just before being interrupted;

DETAILED DESCRIPTION OF THE PREFERRED EMBODIMENTS

FIGS. 6A–6F show timing diagrams, analogous to those of FIGS. 5A–5F, for the operation of the circuit of the invention operating in voltage doubling mode during and after a missing cycle which recovers with the same polarity as that when interrupted. Identical features to those in FIG. 5A–5F have identical reference symbols.

The circuit of the invention detects a missing cycle by sensing a missing zero crossing. A timer counts from each AC voltage zero-crossing time $t_{c0}$ until a certain time period $d_{ZC}$ has expired, such time period being greater than the half period of the lowest frequency AC voltage input likely to be encountered. Under normal operation the timer is reset at each zero crossing and never reaches the end of its timing period.

Figure 6A:
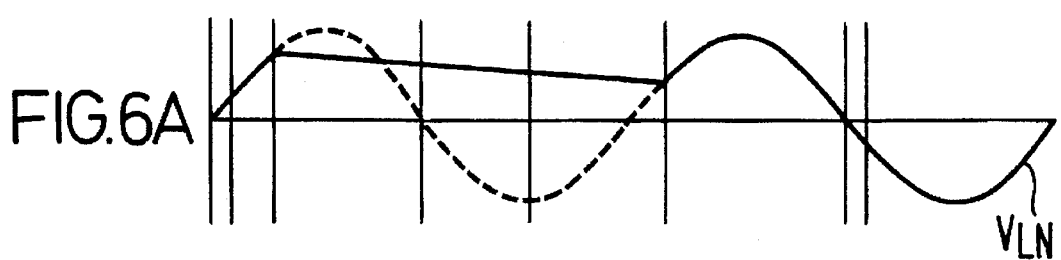
FIGS. 6A–6F are timing diagrams of various voltages applied to and supplied by an automatic doubler/bridge circuit of the invention during a period including an interruption of the AC supply identical to that in FIGS. 5A–5F.
Figure 6B:
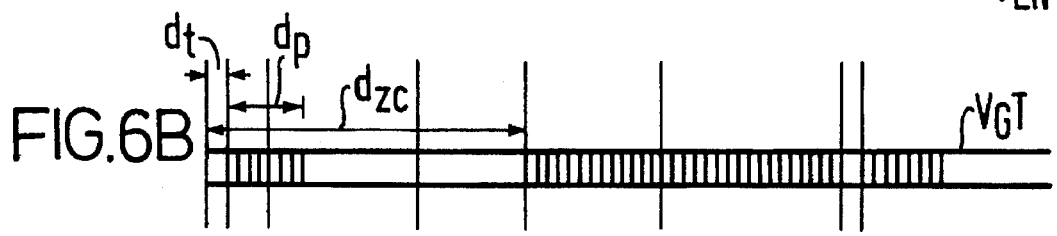
Figure 6C:
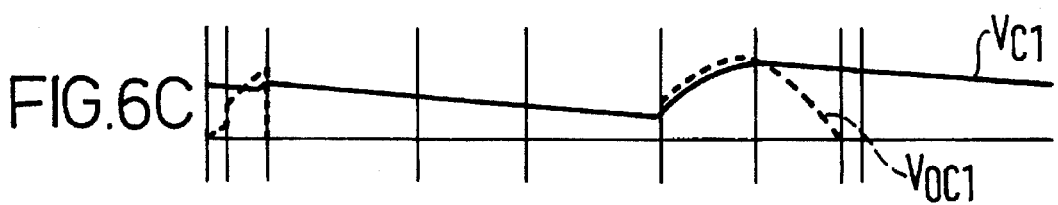
Figure 6D:
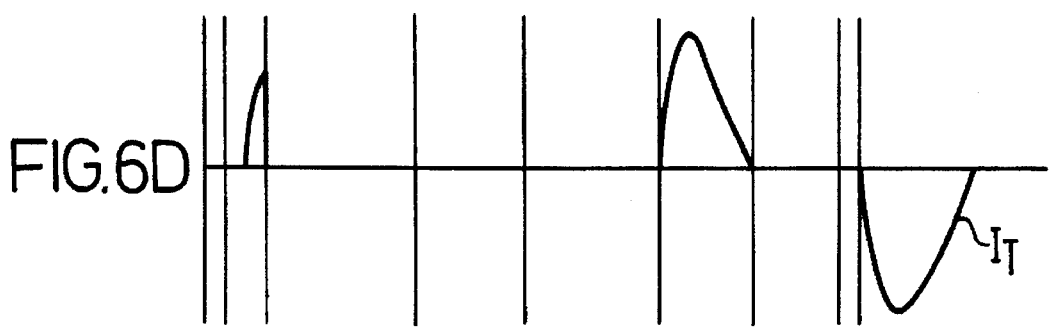
Figure 6E:
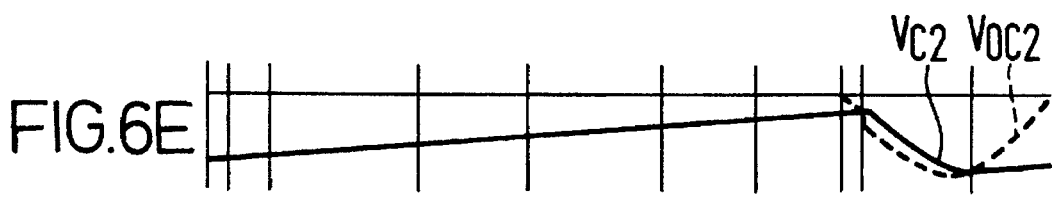
Figure 6F:
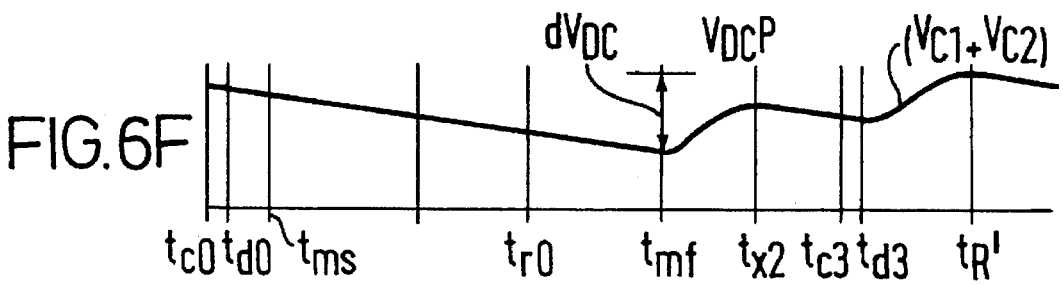

When a missing cycle, such as that between times $t_{ms}$ and $t_{mf}$ in FIG. 6A occurs, the timer counting the time period from the zero crossing time $t_{c0}$ is not reset before the expire of its timing period $d_{ZC}$. Upon expire of this period, at time $t_{r0}$, repeated triac firing pulses begin (FIG. 6B). Timing period $d_{ZC}$ is fixed such that time $t_{r0}$ is approximately that at which a peak voltage of a maximum frequency input is due. The generation of continued triac firing pulses on $V_GT$, figure 6B, ensures that when the AC mains recovers at time $t_{mf}$, triac conduction immediately beans, shown as an increase in $I_T$ in FIG. 6D, and the whole input voltage available from AC input voltage $V_{LN}$ is applied to capacitor $C_1$ (FIG. 6C). In the case illustrated in FIG. 6C, capacitor $C_1$ is fully charged at time $t_{X2}$, as for a normal positive half cycle.

The continued triac firing pulses are stopped at the next valid zero crossing time $t_{c3}$ as this indicates the resumption of AC power. Triac firing pulses on $V_GT$ are then produced at time $t_{d3}$ as normal operation resumes (FIG. 6B).

A further timer is provided so that in case the interruption of AC mains lasts longer than one cycle, continuous triac firing pulses continue for a time at least equal to one period of lowest frequency AC mains and then stop.

The circuit of the invention ensures that voltage doubling recommences at time $t_{mf}$, as soon as AC input power is available, minimising the greatest drop in DC output voltage, $dV_{DC}$. Full DC output is resumed at time $t'_R$, during the first normal half cycle after resumption of AC power.

Figure 1:
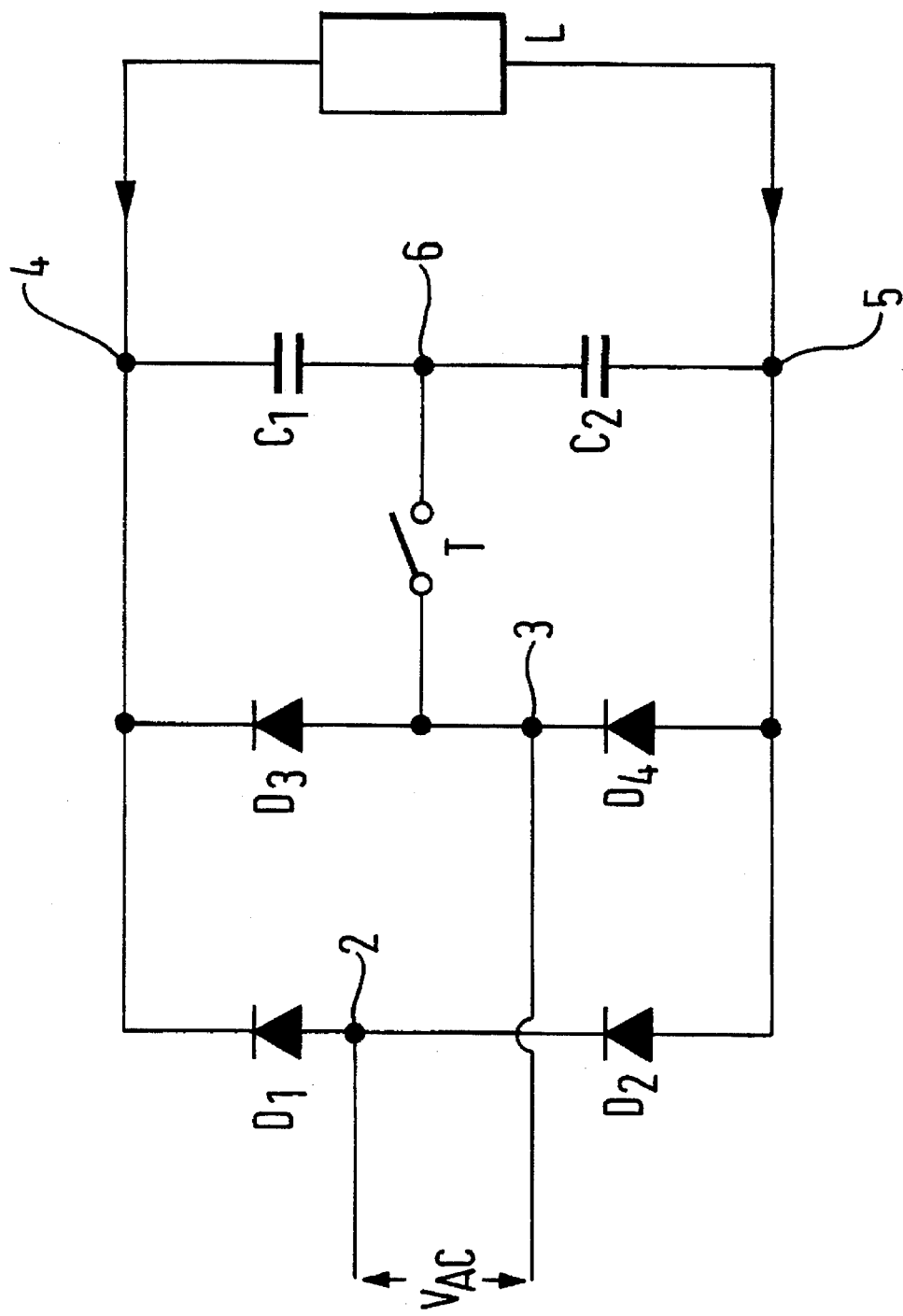
FIG. 1 is a circuit schematic of a doubler/bridge rectifier circuit.
Figure 2:
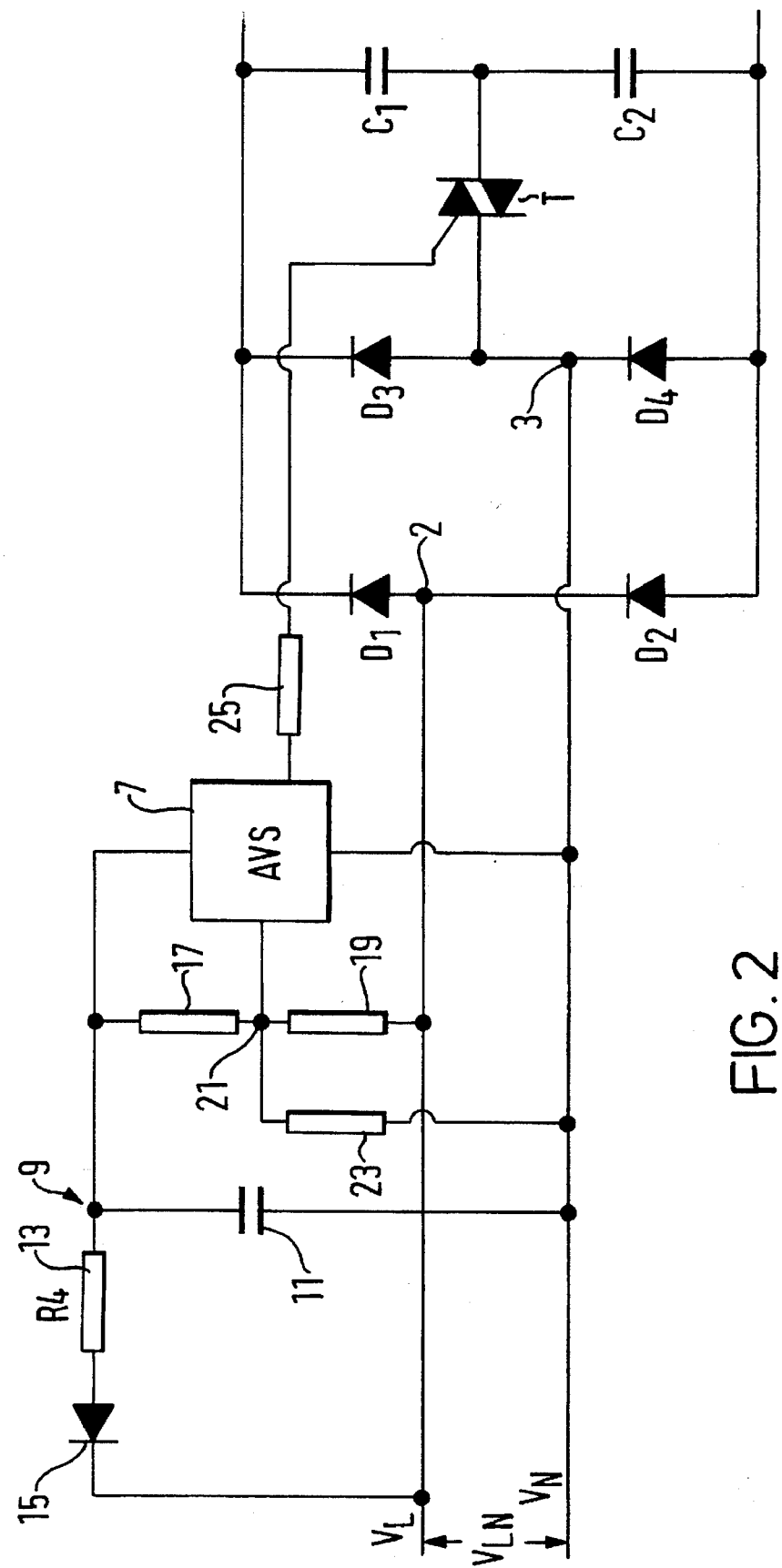
FIG. 2 is a circuit schematic diagram of an automatic voltage doubler/bridge rectifier circuit of the prior art, incorporating an integrated control circuit.
Figure 3A:
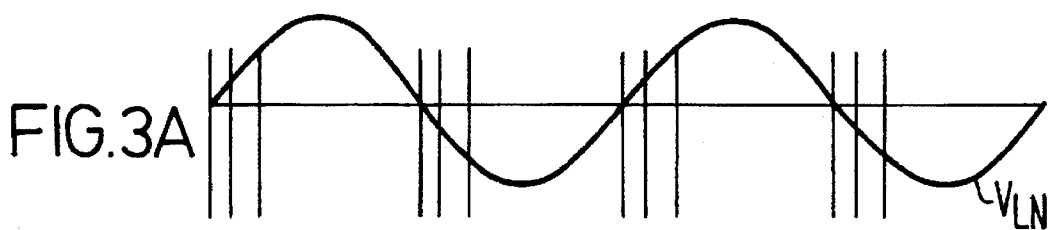
FIGS. 3A–3F are timing diagrams of various voltages applied to and supplied by an automatic doubler/bridge circuit such as that of FIG. 2, operating in voltage doubling rectifier mode during a period of constant AC supply.
Figure 3B:
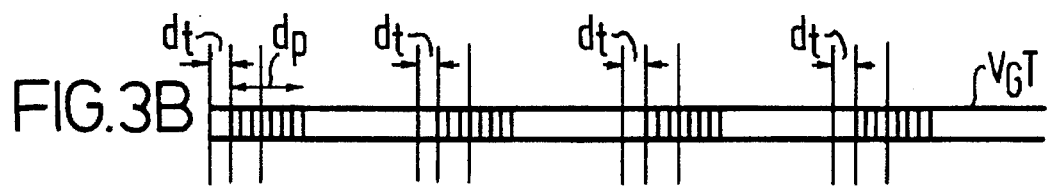
Figure 3C:
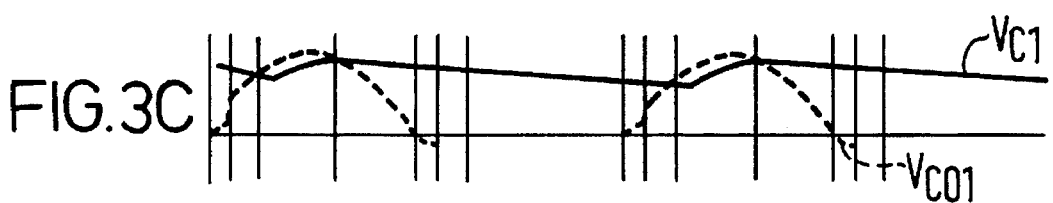
Figure 3D:
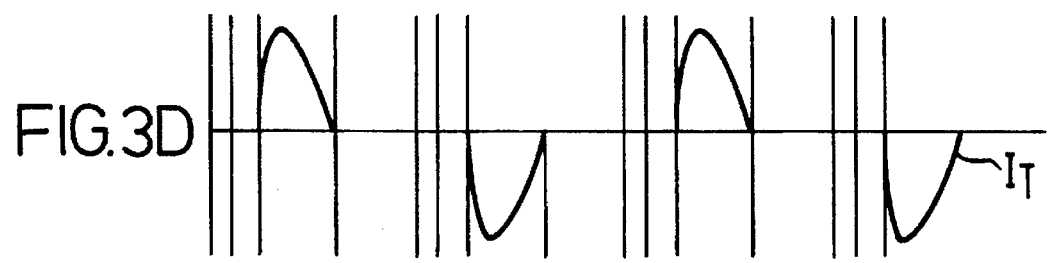
Figure 3E:
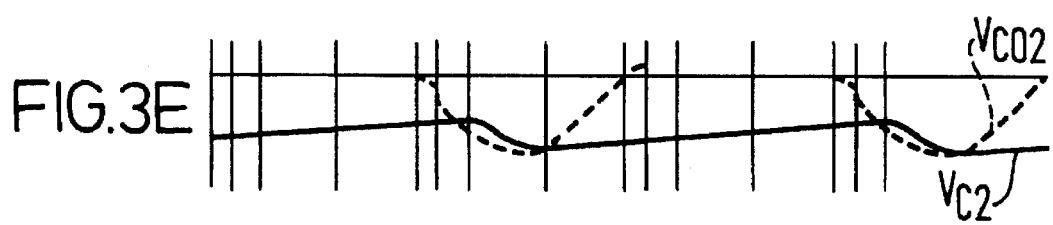
Figure 3F:
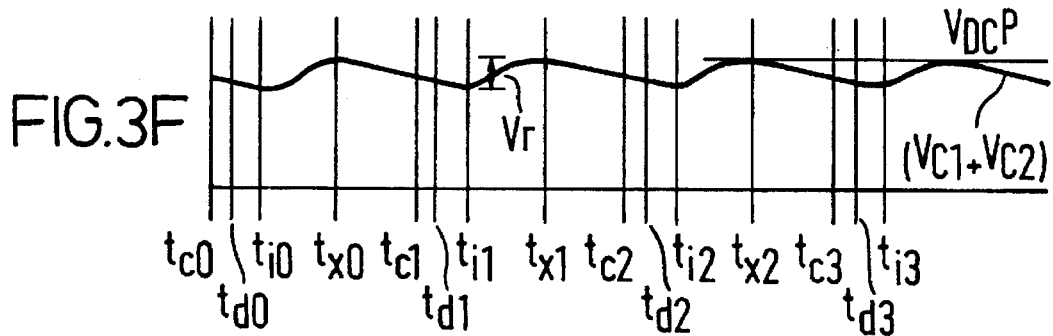
Figure 5A:
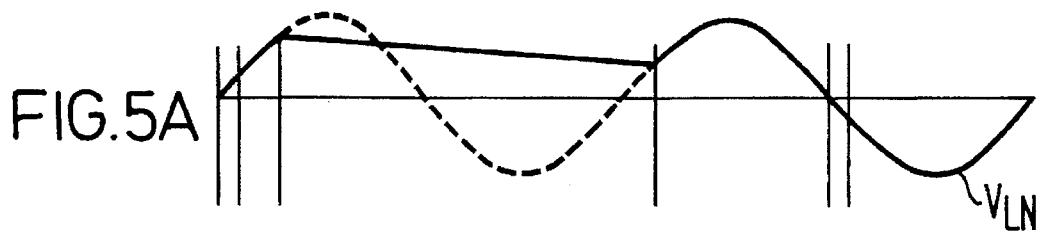
FIGS. 5A–5F are timing diagrams of various voltages applied to and supplied by an automatic doubler/bridge circuit such as that of FIG. 2 during a period including a different interruption of the AC supply which recovers with the same polarity as it had just before being interrupted.
Figure 5B:
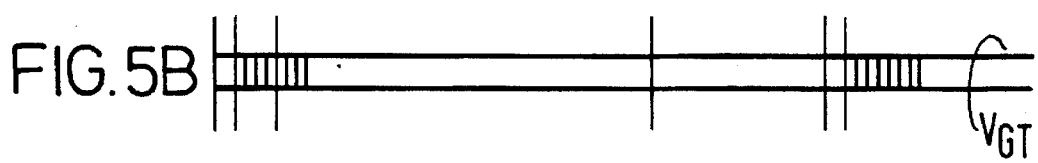
Figure 5C:
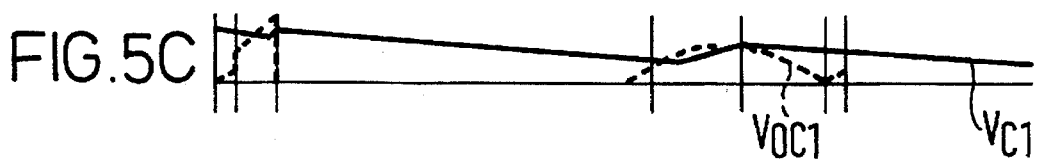
Figure 5D:
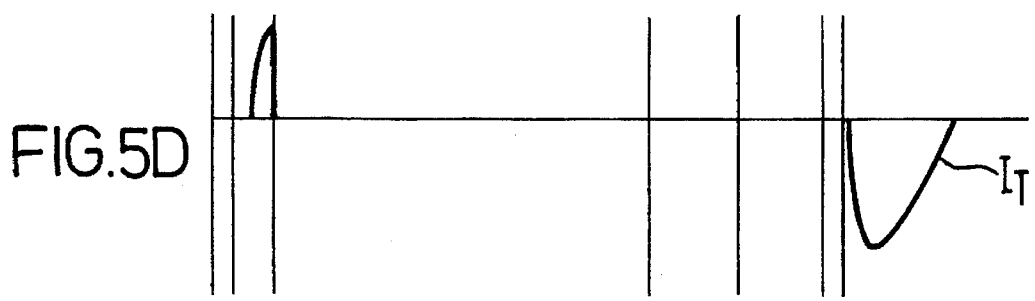
Figure 5E:
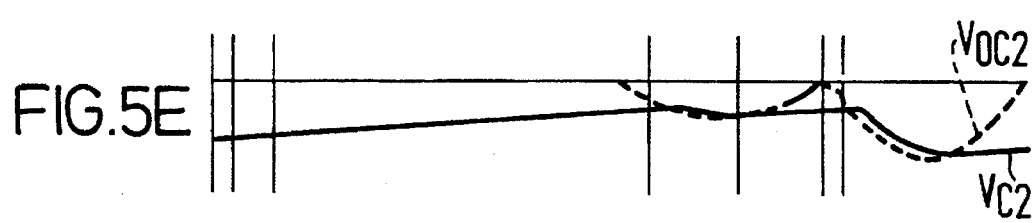
Figure 5F:
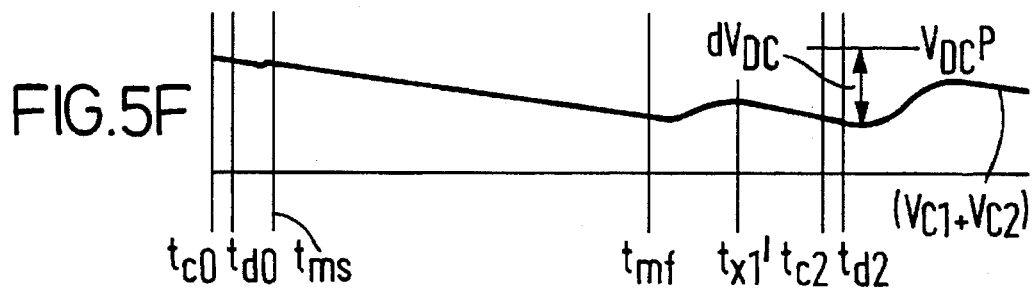
Figure 7:
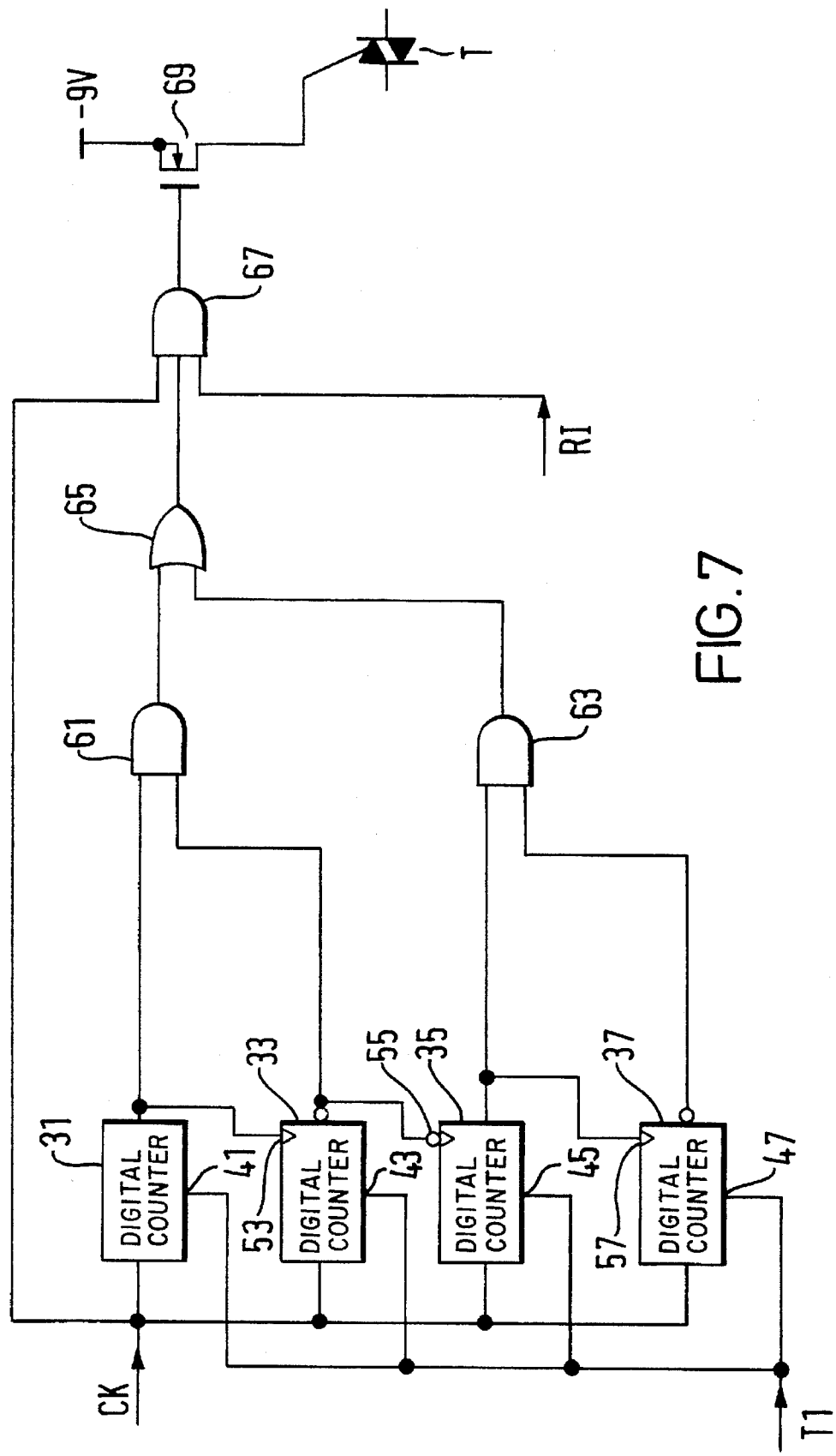
FIG. 7 is a circuit schematic diagram of circuitry according to a first embodiment of the present invention.

FIG. 7 represents a circuit according to an embodiment of the invention. The circuit forms part of the integrated control circuit 7 of FIG. 2 and uses the signals T1, Ck and RI generated within that integrated control circuit, as described above. Four digital counters 31, 33, 35, 37 are supplied with the clock signal Ck generated within the integrated circuit. The counters have their reset terminals 41, 43, 45, 47 connected together so as to receive the signal T1, generated within the integrated circuit, which supplies a short HIGH pulse at every zero crossing.

Counters 31, 35 provide a LOW output when reset, changing to a HIGH at the end of their respective count periods; counters 33, 37 provide output signals of opposite polarity.

Counter 33 has a second, positive edge-triggered, reset input 53 so that it may also be reset by a rising edge on the output of counter 31; counter 35 has a second, negative edge-triggered reset input 55 so that it may also be reset by a falling edge on the output of counter 33; counter 37 has a second, positive edge triggered reset input 57, so that it may also be reset by a rising edge on the output of counter 35. The outputs of counters 31, 33 are each connected to one input of AND gate 61; the outputs of counters 35, 37 are each connected to one input of AND gate 63. The output of each of the AND gates 61, 63 is connected to an input of OR gate 65. The output of gate 65 is connected to one input of three-input AND gate 67. The second input of gate 67 receives the clock signal Ck and the third input receives the active high signal RI, generated within the integrated circuit, which indicates that the AC supply voltage lies within the lower defined range. The output of gate 67 is connected to the control terminal of transistor 69, whose source is connected to a −9 V supply voltage, and whose drain is connected to the control gate of the triac T.

Counters 31, 33, 35, 37 are used in succession. All are reset by a valid zero cross detection signal T1, taking the outputs of 31, 35 low and the outputs of 33, 37 high. With reference to FIGS. 6A–6F and FIG. 7, the first counter 31 counts the delay $d_t$ from the zero crossing points $t_{c0}$–$t_{c3}$ until the commencing of triac firing pulses at times $t_{d0}$–$t_{d3}$. When the delay $d_t$ has elapsed, the output of 31 goes high, producing a high output from OR gate 65. Provided the circuit is in doubler mode, indicated by a high signal RI, repeated triac firing pulses are then produced by the propagation of the clock signal Ck by AND gate 67 to the control electrode of transistor 69, which connects the gate of triac T to the −9 V supply voltage. These pulses continue for the period of time $d_p$, determined by a second counter 33. At the end of its count period, the output of counter 33 goes low, which removes the high outputs of gates 61, 65 disabling propagation of clock signals Ck through gate 67 and also resetting counter 35.

This counter 35 counts a timing period which, when added to the time periods $d_t$ and $d_p$ counted by the first two counters, measures a total period equal to the delay $d_{ZC}$.

In normal operation with an AC input voltage of the lower range Rge2, the third counter 35 is reset at each zero crossing point $t_{c0}$–$t_{c3}$, occurring every half cycle, and so never reaches the end of its count period. When a missing cycle is encountered, no AC input zero crossing occurs within time period $d_{ZC}$, the third counter 35 is not reset and counts to the end of its period. The output of this third counter 35 then goes high, resetting counter 37 and producing a high through gates 63, 65 to gate 67, enabling the propagation of clock pulses and hence triac firing pulses. These pulses continue until either the next valid zero cross is detected, resetting the counters and indicating the resumption of normal AC supply or until the fourth counter 37 has counted for a certain time, which is at least one period of the lowest expected frequency AC supply, at the end of which its output goes low and stops the generation of triac pulses by turning off gate 67. This is necessary so that, in the case of missing cycles lasting longer than one supply period, the control circuit does not generate continuous triac pulses, as the power consumed by the control circuit would discharge the supply smoothing capacitor (11 in FIG. 2) below the minimum supply voltage required by the circuit.

The use of the low AC range indication signal RI at gate 67 ensures that triac firing pulses are only generated provided that the AC supply voltage just before loss of power was within the lower defined range of voltages. If, during the period of continuous triac pulse generation, a supply voltage in excess of the upper limit of the lower defined range is detected, the triac pulses immediately cease, due to a low signal RI at gate (57, preventing the doubling of a high range voltage.

This embodiment incorporates separate timers for timing the normal firing pulse delay $d_t$, the normal period of generation of firing pulses $d_p$, the missing cycle detection period $d_{ZC}$, and the time limit for firing pulse generation following missing cycle detection. However, the functions of two or more of the counters 31, 33, 35, 37 described may in fact be tapped from one single counter so that rather than each counter being reset at the end of its cycle, the single counter signals when each period has elapsed. The single counter is then reset by a zero crossing detection signal T1.

Two alternative embodiments will be described using this principle.

In a particular implementation of the invention, suitable for use with the control circuit sold as the AVS-3 of SGS THOMSON Microelectronics, the normal triac firing pulses are produced in a time window from 1.61 ms to 5.52 ms after each zero crossing point. Seventeen pulses are produced, from a clock signal Ck of 10% duty cycle, 4.4 kHz frequency and a period of 230s. The higher range of voltages Rge1 is from 176 to 264 Vrms, the lower range of voltages Rge2 is from 88 to 132 Vrms and the expected range in AC input frequency is from 47 to 63 Hz. This example will be used in the following discussions.

Figure 8:
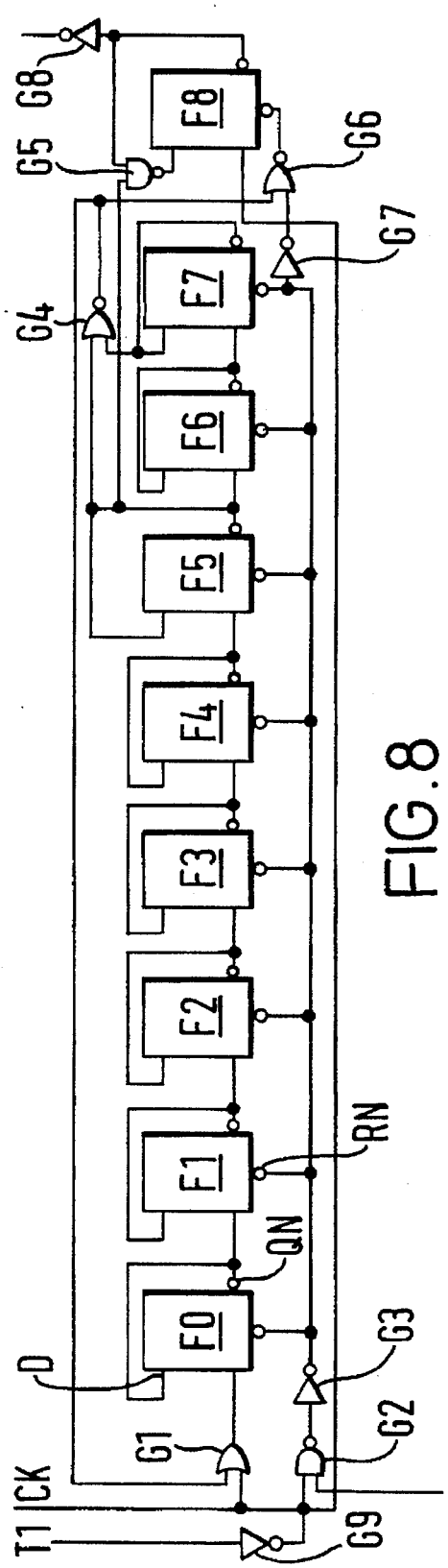
FIG. 8 is a circuit schematic diagram of a counter according to a second embodiment of the invention.

FIG. 8 shows a circuit for timing the period of firing pulse generation following a missing cycle independently of the normal firing pulse delay $d_t$ and period of firing pulse generation $d_p$. The clock signal Ck is provided via OR gate G1 to a D-type flip-flop F0. This D-type flip-flop has its inverted output QN connected to its input D. Identical flip-flops F1–F7 are cascaded to the output of F0. All the flip-flops F0–F7 have their reset terminals RN connected together, and these are further connected to receive a signal from NAND gate G2 and an inverter G3. NAND gate G2 has its second input available for use as a second reset input, which receives an active LOW pulse from other circuitry within the integrated circuit to indicate the end of the normal triac firing period $d_p$. NOR gate G4 receives the inverted outputs of flip-flops F5 and F7. Flip-flop F8 has its input connected to the output of a NAND gate G5 whose inputs are connected to the inverted outputs of flip-flops F8 and F5. The reset terminal of F8 is connected to the output of NOR gate G6, whose inputs are the output of NOR gate G4 and the output of an inverter G7, whose input is the reset signal from inverter G3. The inverted output of flip-flop F8 is inverted by inverter G8. The zero crossing detect signal T1 is applied to inverter G9, whose output is connected to the first input of NAND gate G2.

The signal from inverter G3 is normally high, but becomes low, and hence resets the flip-flops F0–F7 connected to it, when a zero crossing occurs on the AC mains supply, indicated by the signal T1 pulsing high and causing inverter G9 to send a LOW pulse to the first input of NAND gate G2, or at the end of the normal series of firing pulses, when a LOW reset pulse is applied to the second input of NAND gate G2. With all the flip-flops reset, their inverted outputs QN are all 1. The clock signal Ck is supplied to the input D of flip-flop F0. This flip-flop is connected as a divide-by-two counter, thus its output is a periodic waveform of 50% duty cycle and half the frequency of the input clock Ck. Similarly, the output of flip-flop F1 is at frequency one quarter that of the clock frequency and so on until the output of flip flop F7 counts one cycle for 256 cycles of the clock signal Ck.

Flip-flop FIB is connected as a latch. When the active-LOW reset signal is supplied by inverter G3 at zero crossing or the end of the normal firing pulse period $d_p$, the inverter G7 and the NOK gate G6 propagate this to flip-flop F8. When the output of inverter G3 goes high again after the reset pulse, the output of NOK gate G4 will be low, and the active-LOW reset pulse to flip-flop F8 will end. Its inverted output will therefore be high, as will be the inverted output of flip-flop F5. Hence, the output of NAND gate G5, and the input to flip-flop F8, will be 0 and flip-flop F8 will remain in a stable state. This represents the start of the missing cycle detection period $d_{ZC}$–$(d_t+d_p)$.

After 32 cycles of clock Ck, being 7.3 ms with the 230s clock, the inverted output of flip-flop F5 will go low, causing the output of NAND gate G5 to go high, and the inverted output of flip-flop F8 to change state to 0 at the next clock pulse. This keeps the output of NAND gate G5 at 1 after the output of flip-flop F5 has changed state again at 64 clock cycles. The latch F8 is now in a second stable state and retains a 0 inverted output, supplying a 1 at the output of gate G8. This represents the expiry of the missing cycle detection period, $d_{ZC}$, a total of 12.8 ms after the previous zero crossing.

The output of NOK gate G4 goes HIGH after 160 input clock cycles, being the time at which both of its inputs are zero: the output of flip-flop F7 goes to zero after 128 cycles of Ck, and the output of flip-flop F5 next goes low after a further 32 cycles. The high output from NOR gate G4 causes a low output from NOR gate G6, and the latch F8 will reset, returning its inverted output to 1, and the output of inverter G8 to 0. This corresponds to 36.8 ms after the end of the previous normal firing pulse generation period $d_p$, and the end of the continuous firing pulse generation after missing cycle detection. Once the output of NOR gate G4 is HIGH, this places OR gate G1 in a HIGH state, which prevents the transmission of any further clock pulses. The counter comprising flip-flops F0–F7 therefore stops. The counter holds the value 10100000 and the output of gate G1 is held high until the counter is reset by the next mains voltage zero crossing point.

The output of inverter G8 is connected to circuitry such as gate 67 receiving signals Ck and RI, transistor 69, triac T and a −9 V supply as shown in FIG. 7. The output of gate G8 takes the place of the output of gate 65 at the first input of gate 67, enabling the generation of continuous triac gate firing pulses when in a HIGH state.

In this way, the required functionality of enabling continuous triac firing pulses starting at 7.36 ms, being 32 clock periods, after the end of the normal triac triggering pulse period $d_p$, or 12.9 ms after the previous zero crossing is achieved. These pulses continue until ether the next zero crossing or for a maximum period of 29.44 ms, being 128 clock cycles, which ends 160 clock cycles or 36.4 ms, after the end of the normal triggering pulse period $d_p$. Different frequency clock signals may be used, with the connections of gates G4 and G5 changed to ensure correct timing. In this embodiment, the counter for the missing cycle detection is independent from the counters for the normal triac window, except for the reset signals provided at the end of the normal triac firing period.

Figure 9:
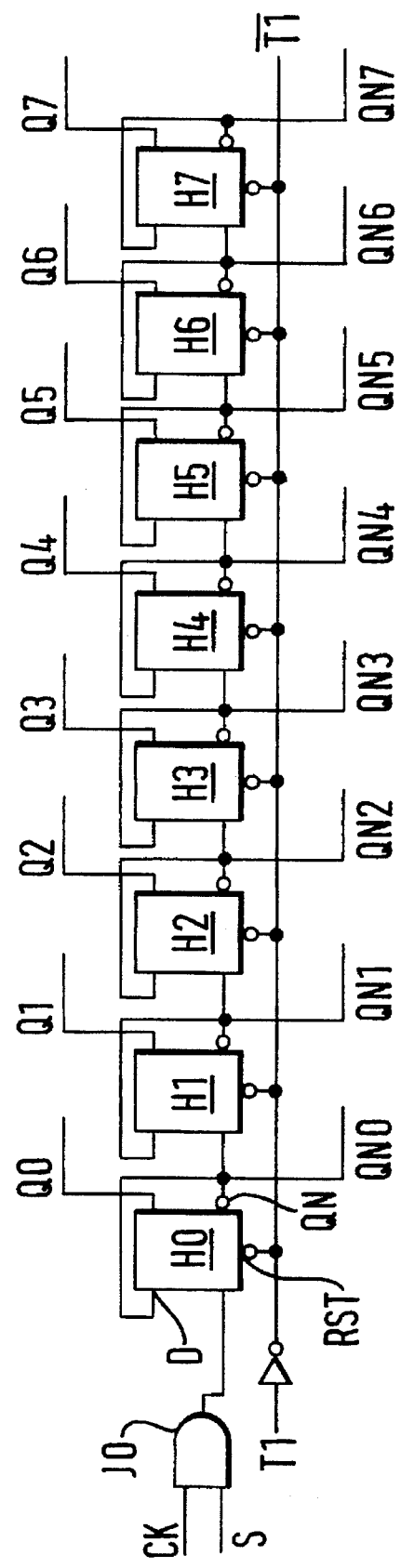
FIGS. 9 and 10 are circuit schematic diagrams of circuitry according to a third embodiment of the invention.
Figure 10:
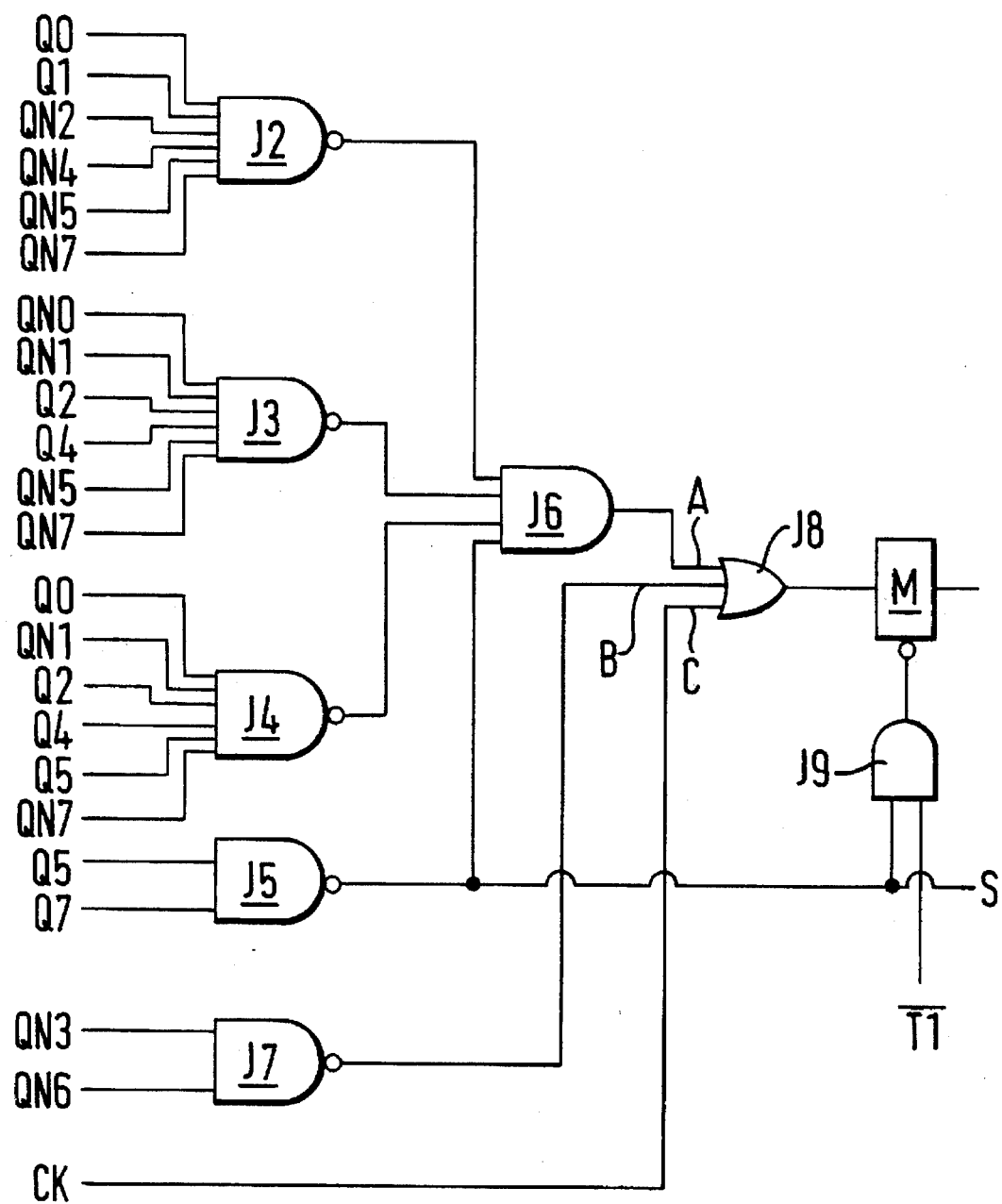

FIGS. 9 and 10 represent, schematically, a third embodiment of the invention, where a single counter is used to count the periods $d_t$ from zero cross to start of triac gate pulse firing window, the duration of triac firing window $d_p$, the time from the zero crossing to the end of the missing cycle detection delay $d_{ZC}$, and the time period for generation of continuous triac firing pulses.

Again, a cascade of eight D-type latches H0–H7 is used, each one being configured as a divide-by-two counter, with ks inverted output QN being fed back to its input D. The clock signal Ck is supplied to AND gate J0, which receives a normally high stop input S on its other input. The reset inputs RST of the latches are connected together, and connected to the active-HIGH zero crossing signal T1 by inverter J1. The cascade of flip-flops then functions as an eight-bit counter. Connections are made to the inverted (QN0–QN7) and non-inverted (Q0–Q7) outputs of each of these counters.

NAND gates J2, J3, J4, J5, J7 have their inputs connected to selected inverted and non-inverted outputs (QN0–QN7, Q0–Q7).

NAND gate J2 has its inputs connected to the non-inverted outputs Q0, Q1 of flip-flops H0, H1 and the inverted outputs QN2, QN4, QN5, QN7 of flip-flops H2, H4, H5, H7; NAND gate J3 has its inputs connected to the non-inverted outputs Q2, Q4 of flip-flops H2, H4 and the inverted outputs QN0, QN1, QN. 5, QN7 of flip-flops H0, H1, H5, H7; NAND gate J4 has its inputs connected to the non-inverted outputs Q0, Q2, Q4, Q5 of flip-flops H0, H2, H4, H5 and the inverted outputs QN1, QN7 of flip-flops H1, H7; NAND gate J5 has its inputs connected to the non-inverted outputs Q5, Q7 of flip-flops H5, H7 and NAND gate J7 has its inputs connected to the inverted outputs QN3, QN6 of flip-flops H3, H6.

The outputs of NAND gates J2, J3, J4, J5 are each connected to an input of a four-input AND gate J6. The outputs of J6 and J7 are connected to inputs A, B of a three-input OR gate J8. The third input C is connected to the clock signal Ck. The output of J8 is connected to the input of toggling latch M, whose reset input is connected to the output of AND gate J9. The output of NAND gate J5 supplies the signal S to AND gate J0. AND gate J9 produces an active low reset signal to latch M when either the inverted zero crossing detection signal from gate J1 or the signal S is low. After a reset pulse from zero crossing signal T1, all non-inverted inputs Q0–Q7 will be low and all inverted outputs QN0–QN7 will be high, and the output $Q_M$ of toggling latch M will be low.

The toggling latch M may be a D-type flip flop with its inverted output $\overline{Q}_M$ connected to its input $D_M$ and receiving toggling pulses on its clock input $C_M$.

Active-LOW pulses are provided to the toggling latch M by gating single pulses of clock signal Ck through OR gate J8. Propagation of clock pulses at other times is prevented by holding one of the inputs of J8 high.

Triac firing pulses are enabled by a high level on the output of the toggling latch M which is connected to an input of AND gate 67 in FIG. 7, whose other inputs are connected to the clock signal Ck and the low AC range indication signal RI as described earlier.

The output of gate J7 holds the output of J8 high and so preventing propagation of any clock pulses to toggling latch M unless Q6 and Q3 are simultaneously low.

The active-LOW output of NAND gate J2 holds the output of gate J6 low when the state 0X00X010 occurs on counters H7–H0 respectively; NAND gate J3 functions identically for the state 0X01X100, gate J4 for the state 0X11X101 and gate J5 for the state 1X1XXXXX.

Active-low pulses are produced by gate J8 when both of its inputs A and B are low, and an active low clock pulse occurs. Its input A is low when one or more of the outputs of gates J2, J3, J4 and J5 are low. The input B is low when the output of J7 is low (i.e. QN3=QN6=1; Q3=Q6=0).

Using this counter, the normal triac firing pulses are first enabled by the output of toggling latch M going high. The first low pulse is generated from gate J2 at a count of 00000010. This corresponds to time $t_{d0}$ in FIG. 6B. When the counter reaches a count of 00010100, gate J3 generates a low pulse, which is propagated by gates J6, J8 to return the output of toggling latch M to low. Between these two events, seventeen clock cycles occur, and seventeen triac firing pulses are generated. This represents the triac firing period $d_p$ for the normal mode of operation during periods of constant AC supply. At a count of 00110101, representing time $t_{r0}$ in FIG. 6B, 12.2 ms after zero crossing, triac firing pulses are re-enabled by the output of gate J4 going low, causing a further active-LOW pulse to be propagated to change the output of toggle latch M to a high state. In normal circumstances, the counter is reset before 10.7 ms after zero crossing, by the next zero crossing indication on signal T1, and the count required to change the output state of gate J4 is never reached.

If no zero crossing, and hence counter reset, has occurred before the counter has reached a count of 10100000, being 36.8 ms after the last zero crossing, gate J5 enables a further active-LOW pulse to toggling latch M, disabling generation of further triac pulses. This output S from gate J5 is also supplied to the S input of AND gate J0, which prevents further clock pulses from reaching latch H0, hence stopping the clock at a count of 10100000.

The current invention therefore fulfils ks objectives by detecting missing cycles of AC mains and ensuring that voltage doubling mode, if required, is initiated as soon as mains voltage returns, reducing both the magnitude and duration of the drop in DC output voltage during the missing cycle. The circuit of the current invention ensures that doubling of a high voltage does not occur. The power consumption of the circuit is kept to a minimum by producing only a limited number of triac firing pulses during normal operation under constant AC supply.

The circuit may be used in an environment where voltage doubling is always required. In this case, the invention acts to protect the load from any random surges of line voltage e.g. transmitted by a supply line in the vicinity of a lightning strike, by immediately disabling voltage doubling. The circuit of the invention is also useful in minimising the loss of DC power during missing cycles. If protection from line voltage surges were not required, the range detection signal RI could even be omitted.

What is claimed is:

1. A circuit for converting an AC input voltage lying within a predetermined range of frequencies and which varies on either side of a base line voltage into a DC output voltage at or above a predetermined minimum level comprising:

a voltage rectification circuit which is operable in a first mode to rectify an AC input voltage lying in a first range of values to produce said DC output voltage and which includes a switch element having a control terminal for receiving a control signal to select the first mode;

baseline voltage crossing detection circuitry arranged to detect baseline crossings of the AC input voltage and to generate the control signal responsive to each baseline crossing;

a timer which is reset at each baseline crossing and which commences measuring a delay from each reset, the timer being operable to generate the control signal when the delay reaches a predetermined value, the predetermined value of the delay being greater than the half period of the lowest of the predetermined range of frequencies.

2. A circuit according to claim 1 wherein the control signal is generated at a predetermined time after each detected baseline crossing, said predetermined time being much shorter than the half period of the lowest of the predetermined range of frequencies.

3. A circuit according to claim 1 or 2 wherein the first mode of operation increases and rectifies the AC input voltage.

4. A circuit according to claim 3 wherein the voltage rectification circuit is operable in a second mode of operation to rectify the AC input voltage when the AC input voltage lies above the first range of values, the switch element being operable to select between the first and second modes of operation.

5. A circuit according to claim 4 which includes a voltage level detection circuit for determining whether the AC voltage lies in the second range of values and for producing a detection signal.

6. A circuit according to claim 5 which includes means for inhibiting supply of the control signal to the switch element when the detection signal indicates that the AC input voltage is inside the second range of values.

7. A circuit according to claim 1 wherein the switching element is a triac and the control signal comprises a plurality of pulses for repeatedly firing the triac.

8. A circuit according to claim 2 wherein the switching element is a triac and the control signal comprises a plurality of pulses for repeatedly firing the triac.

9. A circuit according to claim 7 wherein the pulses are generated for a first time period from a first initiation of the pulses on detection of a baseline crossing.

10. A circuit according to claim 8 wherein the pulses are generated for a first time period from a first initiation of the pulses on detection of a baseline crossing.

11. A circuit according to claim 9 wherein the pulses are generated for a second time period from a second initiation of the pulses when the measured delay reaches a predetermined value.

12. A circuit according to claim 11 wherein the pulses are terminated on detection of a baseline crossing of the AC input voltage by the baseline crossing detection circuitry.

13. A circuit according to claim 1 wherein the voltage rectification circuit includes at least one smoothing capacitor.

14. A circuit according to claim 1 which comprises at least one digital timer.

15. A circuit according to claim 10 which comprises at least one digital timer.

16. A circuit according to claim 15 wherein a first digital timer measures the predetermined time after each detected baseline crossing; a second digital timer measures the first time period from the first initiation of the pulses; a third digital timer measures the predetermined value of the delay and a fourth digital timer measures the second time period from the second initiation of the pulses.

17. A circuit according to claim 16 wherein the digital timers are connected in sequence and each digital timer is reset both at each detected baseline crossing and at the expiry of the time measured by the preceding digital timer.

18. A circuit according to claim 15 wherein a single digital timer is used in conjunction with logic circuitry to measure both the predetermined delay and the second time period from the second initiation of the pulses.

19. A circuit according to claim 18 wherein the single digital timer is reset at each detected baseline crossing, and the output of the logic circuitry changes state at the expiry of the predetermined delay and changes state at the expiry of the second time period from the second initiation of the pulses.

20. A circuit according to claim 14 or claim 15 wherein the digital timer comprises a digital counter connected so as to receive a periodic signal.

21. A circuit according to claim 20 wherein the digital counter is a multistage counter and supplies inverted and non-inverted outputs at each stage, the inverted and non-inverted outputs being connected to a latch via logic circuitry, to generate a signal to change the state of the latch when the appropriate time periods have been measured.

22. A circuit according to claim 21 wherein the signal to change the state of the latch is derived from the periodic signal supplied to the counter.

23. A circuit according to claim 7 which comprises at least one digital timer.

24. A circuit according to either of claim 23 wherein a logic gate receiving the periodic signal and the detection signal from the baseline crossing detection circuitry and which propagates the periodic signal to generate pulses for repeatedly firing the triac.

25. A circuit according to claim 24 wherein the periodic signal propagated by the logic gate is supplied to the gate of a transistor, whose source ana drain are connected to a supply voltage and the gate of the triac, respectively.

26. A method for converting an AC input voltage, with a first and second range of voltages, into a DC output voltage in a first mode of operation and a second mode of operation, comprising:

selecting a first mode of operation corresponding to the first range of voltages of the AC input voltage;

applying the AC input voltage to a diode bridge circuit to rectify the AC input voltage;

detecting baseline crossings of the AC input voltage;

resetting a timer in response to each detected baseline crossing;

in response to detecting a baseline crossing, applying a switch control signal to a switch element connected between said diode bridge and an amplification circuit to enable the amplification of the rectified AC input voltage and produce said DC output voltage;

measuring with the timer a first time elapsed from each detected baseline crossing;

responsive to the measured first time elapsed exceeding a delay value greater than a half period of the threshold frequency and responsive to the selecting step, applying the switch control signal to the switch element.

27. The method of claim 26, further comprising the step of, after the step of generating a control signal in response to the first time elapsed, inhibiting the control signal to the switch element in response to detecting a next baseline crossing.

28. The method of claim 26, further comprising the steps:

selecting a second mode of operation wherein the AC input voltage lies within a second range of voltages; and inhibiting the switch element from enabling the amplification of the rectified AC input voltage.

29. The method of claim 26, wherein the switch element is a triac connected between the diode bridge circuit and the amplification circuit and wherein the switch control signal is a plurality of firing pulses applied to the triac.

30. The method of claim 26, wherein the step of applying the switch control signal to the switch element comprises the steps of:

changing the conductive state of the switch element in response to applying the switch control signal; and in response to changing the switch element to a conductive state, amplifying the AC input voltage with an amplification circuit.

31. The method of claim 26, further comprising the steps:

measuring with the timer a second time elapsed from the first time elapsed; and responsive to the second measured time elapsed exceeding at least one period of the threshold frequency, inhibiting the switch control signal.

32. The method of claim 31, wherein the step of measuring with a timer comprises resetting a plurality of digital counters connected in sequence in response to each detected baseline crossing and in response to a last count of the preceding digital counter in sequence.

33. The method of claim 32, wherein the step of measuring with a timer further comprises measuring a delay elapsed after each detected baseline crossing with a first digital counter, measuring a normal period of generating control signals from the delay elapsed with a second digital counter, measuring the first time elapsed from the normal period of generating control signals with a third digital counter; and measuring the second time elapsed from the first time elapsed with a fourth digital counter.

34. The method of claim 31, wherein the measuring step with a timer comprises the steps of:

resetting a counter at each detected baseline crossing and at each end of a normal period of applying a switch control signal;

advancing the counter to measure the first time elapsed and the second time elapsed; and changing a latch to a first state in response to the counter advancing to a count corresponding to the first time elapsed; and changing the latch to a second state in response to the counter advancing to a count corresponding to the second time elapsed.

35. The method of claim 34, wherein the counter is a plurality of cascaded flip-flops wherein each flip-flop has an output signal with half the frequency of the input signal and a first flip-flop has an input of a clock signal.

36. The method of claim 31, wherein the measuring step with a timer, comprises:

resetting a digital counter at each detected baseline crossing;

outputting by the digital counter inverted and non-inverted signals to a logic circuitry; and generating a signal by the logic circuitry to change the state of a latch when the digital counter outputs signals corresponding to the first time elapsed and the second time elapsed.

37. A method for recovery of an AC/DC convertor to a first mode of operation in response to a missing cycle of an AC input voltage, comprising the steps of;

selecting the first mode of operation in response to the AC input voltage lying within a first low range of AC line voltages;

detecting baseline crossings of the AC input voltage;

resetting a timer in response to each baseline crossing;

in response to each baseline crossing, applying a switch control signal to a switch element to enable the first mode of operation;

measuring a first time elapsed from the baseline crossing; and in response to the first time elapsed exceeding a half period of a threshold frequency of the AC input voltage and in response to the selecting step, enabling the first mode of operation by applying the switch control signal.

38. The method of claim 37, further comprising the step of inhibiting the switch control signal after a second time elapsed at least equal to one period of the threshold frequency.

39. The method of claim 37, further comprising the step of inhibiting the switch control signal in response to a next baseline crossing after the first time elapsed exceeds a half period of the threshold frequency.

40. The method of claim 37, wherein the step of enabling the first mode of operation further comprises the steps of:

changing the conductive state of the switch element by applying a switch control signal to the switch element; and amplifying the AC input voltage in response to the conductive state of the switch element.

41. A circuit for converting an AC input voltage which varies on either side of a base line voltage into a DC output voltage, said circuit comprising:

voltage rectification circuitry for rectifying the AC input voltage to produce the DC output voltage, said voltage rectification circuitry including switching means for controlling the mode of operation of said circuitry;

baseline voltage crossing detection circuitry arranged to cause a control signal to be applied to said switching means in response to the detection of a baseline crossing; and means for detecting a missing cycle in said AC input voltage, said detecting means comprising timer circuitry which is reset at each baseline crossing and which is arranged to cause the control signal to be applied to said switching means if the period from the preceding baseline crossing is greater than a half period of the frequency of the input voltage.

* * * * *

UNITED STATES PATENT AND TRADEMARK OFFICE
CERTIFICATE OF CORRECTION

PATENT NO : 5,654,884
DATED : August 5, 1997
INVENTOR(S) : Muni Mohan

It is certified that error appears in the above-identified patent and that said Letters Patent is hereby corrected as shown below:

Col. 1, ln. 1, delete "MULTISTAND", insert -- MULTISTANDARD --.

Col. 1, ln. 50, delete "through it fails", insert -- through it falls --.

Col. 4, ln. 35, delete "the triac beans", insert -- the triac begins --.

Col. 5, ln. 21, delete "the mount of", insert -- the amount of --.

Col. 5, ln. 24, delete "of DC Output", insert -- of DC output --.

Col. 5, ln. 57, delete "power, the", insert -- power the --.

Col. 5, ln. 58, delete "FIG. 4D, fails", insert --FIG. 4D, falls --.

Col. 6, ln. 23, delete "returns wkh the", insert -- returns with the --.

Col. 9, ln. 9, delete "the expire of", insert -- the expiry of --.

Col. 9, ln. 10, delete "Upon expire", insert -- Upon expiry --.

Col. 9, ln. 16, delete "immediately beans,", insert -- immediately begins, --.

Col. 10, ln. 53, delete "gate (57, preventing", insert -- gate 67, preventing --.

Col. 11, ln. 26, delete  g ate G5 whose", insert -- g ate G5, whose --.

Col. 11, ln. 27, delete "outputs of flip-Hops F8 and FS.", insert -- outputs of flip-flops F8 and F5. --.

Col. 11, ln. 48, delete "at frequency", insert -- at a frequency --.

Col. 11, ln. 52, delete "Flip-flop FIB", insert -- Flip-flop F8 --.

Col. 11, ln. 55, delete " NOK gate", insert -- NOR gate --.

UNITED STATES PATENT AND TRADEMARK OFFICE
CERTIFICATE OF CORRECTION

PATENT NO : 5,654,884
DATED : August 5, 1997
INVENTOR(S) : Muni Mohan

It is certified that error appears in the above-identified patent and that said Letters Patent is hereby corrected as shown below:

Col. 11, ln. 57, delete "output of NOK gate", insert -- output of NOR gate --.

Col. 12, ln. 8, delete "output of NOK gate", insert -- output of NOR gate --.

Col. 12, ln. 54, delete "with ks inverted", insert -- with its inverted --.

Col. 13, ln. 4, delete "ouputs QN0, QN1, QN5. QN7 of", insert -- QN0, QN1, QN5, QN7 of --.

Col. 14, ln. 12, delete "fulfils ks objectives", insert -- fulfills its objectives --.

Col. 16, ln. 10, delete "source ana drain", insert -- source and drain --.

Signed and Sealed this

Twenty-third Day of December, 1997

Attest:

*Attesting Officer*

BRUCE LEHMAN
*Commissioner of Patents and Trademarks*